UNITED STATES PATENT OFFICE 2,049,463

SALTS OF BETA ALKYLATED CHOLINE ALKYL ETHERS AND PROCESSES FOR THEIR PRODUCTION

Randolph T. Major, Mountainside, and Joseph K. Cline, Woodbridge, N. J., assignors to Merck & Co., Inc., Rahway, N. J., a corporation of New Jersey No Drawing. Application August 12, 1932, Serial No. 628,548

10 Claims. (Cl. 260—25)

This invention relates to processes for the production of salts of beta alkylated choline alkyl ethers, compounds suitable for therapeutic use. In general, such processes are concerned with the addition of trimethylamine to alpha-alkyl-beta-bromoethyl-alkyl ethers. The alpha-alkyl-beta-bromoethyl-alkyl ethers were prepared in the manner described by Swallen and Boord, J. A. C. S., 52, 651 (1930).

These beta alkylated choline alkyl ether salts have not been described in the literature previously. Their general formula is as follows: $[(CH_3)_3NCH_2CHROR']_nX$, where X is an acid radical, $n$ is its valence, and R and R' are alkyl groups such as methyl, ethyl, propyl, butyl, etc. Compounds of the choline alkyl ether type where R is a hydrogen atom have been described by H. H. Dale, J. Pharmacol. 6, 147 (1914), and A. J. Ewins, Biol. J. 8, 44 & 209, 366–73 (1914).

For the preparation of the beta alkylated choline ethers, the following will serve as an example.

*Example 1.*— Alpha-methyl-beta-bromoethyl-ethyl ether is heated with the equivalent amount of a 33% solution of trimethylamine in benzene for a period of twelve hours at 100° C. The resultant reaction product is a more or less discolored crystalline mass. This is dissolved in absolute alcohol and the solution decolorized with activated charcoal. The charcoal is removed by filtration. In order to precipitate the product completely, the alcoholic filtrate is evaporated to small volume and anhydrous ether added. Beta methylcholine bromide ethyl ether precipitates as a microcrystalline white hygroscopic powder, soluble in alchol and water, insoluble in ether and benzene, but slightly soluble in ether containing small amounts of alcohol. Melting point 130–132° C. On standing, the compound becomes slightly discolored.

The beta-methylcholine chloride ethyl ether is prepared by shaking an alcoholic solution of beta-methylcholine bromide ethyl ether with a slight excess of silver chloride. When the reaction is completed (in about 15 to 20 minutes with a solution at 50° C.), the silver chloride and silver bromide are filtered off and the filtrate treated with hydrogen sulphide. The small amount of silver sulphide which precipitates is removed with activated charcoal, and the charcoal removed by filtration. The clear filtrate is then evaporated to remove the excess of alcohol. To the small volume remaining, anhydrous ether is added. The beta-methylcholine chloride ethyl ether precipitates out as a pure white microcrystalline hygroscopic powder soluble in alcohol and water, insoluble in ether and benzene, but slightly soluble in ether containing small amounts of alcohol. It has a melting point of 132–134° C.

*Example II.*—Alpha-propyl-beta-bromoethyl-ethyl ether is heated with the equivalent amount of a 33% solution of trimethylamine in benzene for a period of 16 hours at 118° C. The product of the reaction is removed from the vessel in which it had been heated and the benzene removed by evaporation. The oil which remains is then allowed to crystallize and is dissolved in cold chloroform. Any insoluble portion consisting of tetramethylammonium bromide is removed by filtration. Anhydrous ether is added to the filtrate, and the beta-propylcholine bromide ethyl ether precipitated as a microcrystalline white powder soluble in alcohol, water, chloroform and ethyl acetate, slightly soluble in benzene and ether containing small amounts of alcohol, but insoluble in ether and petroleum ether. Melting point 147°–149° C.

Beta-propylcholine chloride ethyl ether is prepared by shaking an alcoholic solution of beta-propylcholine bromide ethyl ether with a slight excess of silver chloride. When the reaction is complete (in 15 to 20 minutes at 50°–60° C.), the silver chloride and silver bromide are filtered off and the filtrate treated with hydrogen sulphide. The small amount of silver sulphide which is precipitated is then removed with activated charcoal. The charcoal is removed by filtration and the filtrate evaporated to remove the alcohol. Chloroform is continuously added during the evaporation so that the alcohol will be gradually displaced by chloroform. To the clear chloroform solution, anhydrous ether is added. The beta-propylcholine chloride ethyl ether precipitates out as a pure white microcrystalline hygroscopic powder soluble in alcohol, water, chloroform and ethyl acetate, slightly soluble in benzene and ether containing small amounts of alcohol, but insoluble in ether. Melting point 148–150° C.

For purification of the higher members of the series, benzene may often be used to advantage as a solvent. Solutions in benzene are added to anhydrous ether to effect precipitation. Direct recrystallization from ethyl acetate may also be resorted to at times, as well as ethyl acetate solutions being precipitated by the addition of anhydrous ether.

Examples for the production of other products of this series can be readily derived by reference to the tables of further examples which are given below. The procedure is analogous in every case. Substitution of the products contained in the table for each of the choline alkyl ethers prepared in accordance with the foregoing examples will suffice.

For example, the given alpha-alkyl-beta-bromoalkyl ether shown in the first column, upon reaction with trimethylamine, yields the corresponding beta-alkylcholine bromide alkyl ether given in the same line in the third column.

In order to elucidate the process further, a general reaction may be written as follows:

$BrCH_2CHROR' + (CH_3)_3N \rightarrow$
$(CH_3)_3NBrCH_2CHROR'$
$n[(CH_3)_3NBrCH_2CHROR'] + Ag_nX \rightarrow$
$nAgBr + ((CH_3)_3NBrCH_2CHROR')_nX$ where R and R' are alkyl groups, X is an acid radical, and n is its valence. X must, of course, be an acid radical whose silver salt is more soluble than silver bromide.

Thus, also, some of the sulphates may be prepared as, for example, the beta-methylcholine sulphate n-butyl ether, by shaking the bromide with silver sulphate in place of silver chloride, as shown in the tabulation above.

Various modifications of the general process thus outlined are obviously possible without departing from the general spirit and scope of the invention as above outlined.

| Alpha-alkyl-beta-bromo-alkyl ether used | Formula | Beta-alkylcholine bromide alkyl ether obtained | Formula | Melting point of bromide °C. | Melting point of chloride °C. |
|---|---|---|---|---|---|
| Alpha-methyl-beta-bromoethyl methyl ether. | $CH_3OCH(CH_3)CH_2Br$ | Beta-methylcholine bromide methyl ether. | $CH_3OCH(CH_3)CH_2N(CH_3)_3Br$ | 116–118 clear 123 | 135–136 |
| Alpha-ethyl-beta-bromoethyl methyl-ether. | $CH_3OCH(C_2H_5)CH_2Br$ | Beta-ethylcholine bromide methyl ether. | $CH_3OCH(C_2H_5)CH_2N(CH_3)_3Br$ | 122–124 | 101–103 in vacuo |
| Alpha-n-propyl-beta-bromoethyl methyl ether. | $CH_3OCH(C_3H_7)CH_2Br$ | Beta-n-propylcholine bromide methyl ether. | $CH_3OCH(C_3H_7)CH_2N(CH_3)_3Br$ | 101–103 | 112–114 |
| Alpha-n-butyl-beta-bromoethyl methyl ether. | $CH_3OCH(C_4H_9)CH_2Br$ | Beta-n-butylcholine bromide methyl ether. | $CH_3OCH(C_4H_9)CH_2N(CH_3)_3Br$ | 98–100 | 101–103 |
| Alpha-methyl-beta-bromoethyl ethyl ether. | $C_2H_5OCH(CH_3)CH_2Br$ | Beta-methylcholine bromide ethyl ether. | $C_2H_5OCH(CH_3)CH_2N(CH_3)_3Br$ | 130–132 | 132–134 |
| Alpha-ethyl-beta-bromoethyl ethyl ether. | $C_2H_5OCH(C_2H_5)CH_2Br$ | Beta-ethylcholine bromide ethyl ether. | $C_2H_5OCH(C_2H_5)CH_2N(CH_3)_3Br$ | 159–160 | 160–162 |
| Alpha-n-propyl-beta-bromoethyl ethyl ether. | $C_2H_5OCH(C_3H_7)CH_2Br$ | Beta-n-propylcholine bromide ethyl ether. | $C_2H_5OCH(C_3H_7)CH_2N(CH_3)_3Br$ | 147–149 | 148–150 |
| Alpha-n-butyl-beta-bromoethyl ethyl ether. | $C_2H_5OCH(C_4H_9)CH_2Br$ | Beta-n-butylcholine bromide ethyl ether. | $C_2H_5OCH(C_4H_9)CH_2N(CH_3)_3Br$ | 148–149 | 132–134 |
| Alpha-ethyl-beta-bromoethyl n-propyl ether. | $C_3H_7OCH(C_2H_5)CH_2Br$ | Beta-ethylcholine bromide n-propyl ether. | $C_3H_7OCH(C_2H_5)CH_2N(CH_3)_3Br$ | 147–149 | 148–150 |
| Alpha-methyl-beta-bromoethyl n-butyl ether. | $C_4H_9OCH(CH_3)CH_2Br$ | Beta-methylcholine bromide n-butyl ether. | $C_4H_9OCH(CH_3)CH_2N(CH_3)_3Br$ | 101–103 | 100–102* |
| Alpha-ethyl-beta-bromoethyl-n-butyl-ether. | $C_4H_9OCH(C_2H_5)CH_2Br$ | Beta-ethylcholine bromide n-butyl ether. | $C_4H_9OCH(C_2H_5)CH_2N(CH_3)_3Br$ | 128–130 | 133–134 |
| Alpha-n-propyl-beta-bromoethyl-n-butyl-ether. | $C_4H_9OCH(C_3H_7)CH_2Br$ | Beta-n-propylcholine bromide n-butyl ether. | $C_4H_9OCH(C_3H_7)CH_2N(CH_3)_3Br$ | 109–112 | 95–97 |
| Alpha-n-butyl-beta-bromoethyl-n-butyl-ether. | $C_4H_9OCH(C_4H_9)CH_2Br$ | Beta-n-butylcholine bromide n-butyl ether. | $C_4H_9OCH(C_4H_9)CH_2N(CH_3)_3Br$ | 100–102 | (oil) |
| Alpha-n-propyl-beta-bromoethyl-n-amyl-ether. | $C_5H_{11}OCH(C_3H_7)CH_2Br$ | Beta-n-propylcholine bromide n-amyl ether. | $C_5H_{11}OCH(C_3H_7)CH_2N(CH_3)_3Br$ | 105–107 | 101–103 |

*Sulphate, melting-point 100–102° C. The sulphate is prepared by shaking the bromide with silver sulphate in place of silver chloride. The chloride of this compound was an oil.

For the transformation of the bromides to the chlorides, an additional process is possible. Example: Beta-ethylcholine bromide -n-butyl ether is shaken with an excess of silver oxide in a 95% alcohol solution. The mixture is kept cool. When no more halogen ions are noted in the clear liquid, the silver oxide and silver bromide are filtered off. The solution is cooled in ice and neutralized with hydrogen chloride. Hydrogen sulphide is next added, and the small amount of silver sulphide removed with activated charcoal. The charcoal is removed by filtration, and the clear filtrate evaporated (preferably in vacuo), benzene being slowly added to aid in removing the water and alcohol. The oil remaining is dissolved in chloroform, and anhydrous ether is added to the chloroform solution. Beta-ethylcholine chloride-n-butyl ether precipitates as a white, slightly hygroscopic microcrystalline powder, soluble in alcohol, water, benzene and ethyl acetate, slightly soluble in ether containing small amounts of alcohol, but insoluble in ether and petroleum ether. Melting point 133–134° C.

What we claim as new, and on which we pray the issuance of Letters Patent, is:—

1. Salts of beta-alkylated-choline alkyl ethers having the general formula $[(CH_3)_3NCH_2CHROR']_nX$ where X is an acid radical whose silver salt is not less soluble than silver bromide, n is its valence, and R and R' are alkyl groups.

2. Salts of beta-alkylated-choline ethyl ether wherein the acid radical is one whose siver salt is not less soluble than silver bromide.

3. Salts of beta-methylcholine alkyl ether wherein the acid radical is one whose silver salt is not less soluble than silver bromide.

4. Salts of beta-propylcholine alkyl ether wherein the acid radical is one whose silver salt is not less soluble than silver bromide.

5. Salts of beta-methylcholine ethyl ether wherein the acid radical is one whose silver salt is not less soluble than silver bromide.

6. Salts of beta-n-propylcholine ethyl ether wherein the acid radical is one whose silver salt is not less soluble than silver bromide.

7. Beta-methylcholine bromide ethyl ether having the formula $$C_2H_5OCH(CH_3)CH_2N(CH_3)_3Br$$

forming white hygroscopic crystals melting at 130–132° C.

8. Beta-methylcholine chloride ethyl ether having the formula.

$$CH_3OCH(CH_3)CH_2N(CH_3)_3Cl$$

forming white hygroscopic crystals melting at 132–134° C.

9. Beta-n-propylcholine chloride ethyl ether having the formula $$C_2H_5OCH(C_3H_7)CH_2N(CH_3)_3Cl$$

forming white hygroscopic crystals melting at 148–150° C.

10. The process of making beta-methylcholine bromide ethyl ether, which comprises the step of reacting upon alpha-methyl-beta-bromoethyl ethyl ether with an equivalent amount of a solution of trimethylamine in benzene, for a period of about 12 hours at 100–125° C.

RANDOLPH T. MAJOR.
JOSEPH K. CLINE.